(12) United States Patent
Lei et al.

(10) Patent No.: US 11,695,190 B2
(45) Date of Patent: Jul. 4, 2023

(54) SECONDARY BATTERY

(71) Applicant: Contemporary Amperex Technology Co., Limited, Fujian (CN)

(72) Inventors: Yuyong Lei, Ningde (CN); Chengyou Xing, Ningde (CN); Peng Wang, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 168 days.

(21) Appl. No.: 17/388,039

(22) Filed: Jul. 29, 2021

(65) Prior Publication Data
US 2021/0359381 A1 Nov. 18, 2021

Related U.S. Application Data

(63) Continuation of application No. PCT/CN2019/075564, filed on Feb. 20, 2019.

(30) Foreign Application Priority Data

Jan. 30, 2019 (CN) .......................... 201920172256.9

(51) Int. Cl.
*H01M 50/54* (2021.01)
*H01M 50/176* (2021.01)
(Continued)

(52) U.S. Cl.
CPC ......... *H01M 50/54* (2021.01); *H01M 50/147* (2021.01); *H01M 50/176* (2021.01);
(Continued)

(58) Field of Classification Search
CPC ........... H01M 10/0431; H01M 50/147; H01M 50/15; H01M 50/176; H01M 50/528;
(Continued)

(56) References Cited

U.S. PATENT DOCUMENTS

| 2015/0104694 A1* | 4/2015 | Okuda ................. H01M 50/533 429/162 |
| 2015/0188146 A1* | 7/2015 | Shinto ................. H01M 50/176 429/211 |

(Continued)

FOREIGN PATENT DOCUMENTS

| CN | 206742372 U | 12/2017 |
| CN | 208127328 U | 11/2018 |

OTHER PUBLICATIONS

The First Office Action for European Application No. 19913715.9, dated Jun. 14, 2022, 5 pages.
(Continued)

*Primary Examiner* — Lingwen R Zeng
(74) *Attorney, Agent, or Firm* — East IP P.C.

(57) ABSTRACT

The present application provides a secondary battery, which includes a first electrode assembly, a second electrode assembly, a case, and a top cap assembly. The top cap assembly includes a top cap plate and a first electrode terminal, the top cap plate is connected to the case, and the first electrode terminal is arranged on the top cap plate. The first electrode assembly includes a first body and first tabs extending from the first body, and the first tabs are multiple and stacked. The second electrode assembly includes a second body and second tabs extending from the second body, and the second tabs are multiple and stacked. An end of each of the second tabs that is away from the second body is a second end portion. Each of the first tabs includes a first connecting portion extending beyond the second end portion.

10 Claims, 7 Drawing Sheets

(51) Int. Cl.
*H01M 50/147* (2021.01)
*H01M 50/528* (2021.01)
*H01M 50/543* (2021.01)
*H01M 50/533* (2021.01)
*H01M 10/04* (2006.01)
*H01M 50/538* (2021.01)
*H01M 50/553* (2021.01)
*H01M 50/15* (2021.01)

(52) U.S. Cl.
CPC ....... *H01M 50/528* (2021.01); *H01M 50/533* (2021.01); *H01M 50/543* (2021.01); *H01M 10/0431* (2013.01); *H01M 50/15* (2021.01); *H01M 50/538* (2021.01); *H01M 50/553* (2021.01); *Y02E 60/10* (2013.01); *Y02P 70/50* (2015.11)

(58) Field of Classification Search
CPC .. H01M 50/533; H01M 50/538; H01M 50/54; H01M 50/543; H01M 50/553; Y02E 60/10; Y02P 70/50
See application file for complete search history.

(56) References Cited

U.S. PATENT DOCUMENTS

2018/0375162 A1    12/2018  Wakimoto et al.
2020/0212413 A1*    7/2020  Wakimoto .......... H01M 50/176

OTHER PUBLICATIONS

PCT International Search Report for PCT/CN2019/075564, dated Nov. 4, 2019, 8 pages.
The extended European search report for EP Application No. 19913715.9, dated Jan. 5, 2022, 9 pages.

* cited by examiner

SECONDARY BATTERY

CROSS-REFERENCE TO RELATED APPLICATIONS

This application is a continuation of International Application No. PCT/CN2019/075564, filed on Feb. 20, 2019, which claims priority to Chinese Patent Application No. 201920172256.9, filed on Jan. 30, 2019, both of which are hereby incorporated by reference in their entireties.

TECHNICAL FIELD

The present application relates to the field of batteries, in particular to a secondary battery.

BACKGROUND

A secondary battery generally includes a case, electrode assemblies housed in the case, and a top cap assembly fixed to the case. The electrode assembly is electrically connected to electrode terminals of the top cap assembly via tabs. In order to increase battery capacity, the secondary battery is generally provided with a plurality of electrode assemblies inside. When being assembled, the tabs of the plurality of electrode assemblies need to be gathered together and then connected to the electrode terminals at the same time. However, there is some distance between the tabs of adjacent electrode assemblies. When the tabs of multiple electrode assemblies are gathered together, there will be dislocations between the tabs. In order to compensate for the dislocations and connect all the tabs to the electrode terminals at the same time, the length of the tabs is required to be increased, resulting in the waste of materials. Besides, overly long tabs are likely to be inserted into the electrode assembly, which causes the risk of short circuit.

SUMMARY

In view of the problems described in the background section, the present application aims to provide a secondary battery with which the required length of the tabs can be reduced, the materials can be saved, and the risk of short circuits can be reduced.

In order to achieve the above object, the present application provides a secondary battery including a first electrode assembly, a second electrode assembly, a case, and a top cap assembly. The first electrode assembly and the second electrode assembly are housed in the case. The top cap assembly includes a top cap plate and a first electrode terminal, the top cap plate is connected to the case, and the first electrode terminal is arranged on the top cap plate. The first electrode assembly includes a first body and first tabs extending from the first body, and the first tabs are multiple and stacked. The second electrode assembly includes a second body and second tabs extending from the second body, and the second tabs are multiple and stacked. The second tabs are bent toward a direction approaching the first tabs and connected to the first tabs, and an end of each of the second tabs that is away from the second body is a second end portion. Each of the first tabs includes a first connecting portion extending beyond the second end portion, and the first connecting portion is connected to the first electrode terminal.

Each of the first tabs further includes a first extending portion, the first extending portion is connected between the first connecting portions and the first body, and the second tabs are welded to first extending portions of the first tabs.

Each of the second tabs further includes a second extending portion and a second connecting portion, the second extending portion is connected to the second body and extends toward a direction approaching the first extending portion, and the second connecting portion extends from an end of the second extending portion that is away from the second body, and is welded to the first extending portion.

Second connecting portions of the second tabs are welded to the first extending portions of the multiple first tabs to form a first welded region.

The secondary battery further includes an adapter piece, and the adapter piece is connected to the first electrode terminal. First connecting portions of the first tabs are welded to the adapter piece to form a second welded region, and an area of the second welded region is greater than or equal to an area of the first welded region.

The first tabs are arranged on a side of a thickness center of the first electrode assembly. The second tabs are arranged on a side of a thickness center of the second electrode assembly. The first tabs are arranged close to an interface between the first electrode assembly and the second electrode assembly and the second tabs are arranged away from the interface between the first electrode assembly and the second electrode assembly, or, the second tabs are arranged close to the interface between the first electrode assembly and the second electrode assembly and the first tabs are arranged away from the interface between the first electrode assembly and the second electrode assembly.

The first tabs are arranged on a side of the thickness center of the first electrode assembly that is away from the interface.

The secondary battery further includes a third electrode assembly and a fourth electrode assembly that are housed in the case, and the first electrode assembly, the second electrode assembly, the third electrode assembly and the fourth electrode assembly are sequentially arranged. The third electrode assembly includes a third body and third tabs extending from the third body, and the third tabs are multiple and stacked. The fourth electrode assembly includes a fourth body and fourth tabs extending from the fourth body, and the fourth tabs are multiple and stacked. The third tabs are bent toward a direction approaching the fourth tabs and connected to the fourth tabs, and an end of each of the third tabs that is away from the third body is a third end portion. Each of the fourth tabs includes a fourth connecting portion extending beyond the third end portion, and the fourth connecting portion is connected to the first electrode terminal.

The secondary battery further includes a fifth electrode assembly, the fifth electrode assembly is housed in the case, and the fifth electrode assembly is arranged on a side of the second electrode assembly that is away from the first electrode assembly. The fifth electrode assembly include a fifth body and fifth tabs extending from the fifth body, and the fifth tabs are bent toward a direction approaching the second tabs and welded to the second tabs.

The secondary battery includes multiple fifth electrode assemblies sequentially arranged in a direction away from the second electrode assembly, and fifth tabs of each of the fifth electrode assemblies are bent toward a direction approaching the second tabs. The fifth tabs of a fifth electrode assembly adjacent to the second electrode assembly are welded to the second tabs. The fifth tabs of each of the other fifth electrode assemblies than the fifth electrode assembly adjacent to the second electrode assembly are welded to the fifth tabs of an adjacent fifth electrode assembly.

The present application further provides an apparatus including the secondary battery as described above, where the secondary battery is adapted to provide power for the apparatus.

The beneficial effects of the application are as follows: compared with the prior art, in the present application, there is no need to connect the first tabs and the second tabs to the first electrode terminal at the same time, that is, there is no need to compensate for the dislocations between the first tabs and the second tabs. Therefore, according to the present application, the required length of the tabs can be reduced, the materials can be saved, and the tabs being inserted into the first body or the second body can be avoided, which reduces the risk of short circuit.

The reference signs are as follows'

1 First electrode assembly
11 First body
12 First tab
121 First extending portion
122 First connecting portion
123 First gathering portion
124 first end portion
2 Second electrode assembly
21 Second body
22 Second tab
221 Second extending portion
222 Second connecting portion
223 Second gathering portion
224 second end portion
3 Third electrode assembly
31 Third body
32 Third tab
321 third end portion
4 Fourth electrode assembly
41 Fourth body
42 Fourth tab
421 Fourth extending portion
422 Fourth connecting portion 5 Fifth electrode assembly
51 Fifth body
52 Fifth tab
6 Case
7 Top cap assembly
71 Top cap plate
72 First electrode terminal
73 Second electrode terminal
8 Adapter piece
81 First part
82 Second part
83 Third part
9 Welding protection piece
P1 Positive electrode plate
P11 Positive current collector
P12 Positive active material layer
P2 Negative electrode plate
P21 Negative current collector
P22 Negative active material layer
P3 Separator
W1 First welded region
W2 Second welded region
W3 Third welded region
X Width direction
Y Thickness direction
Z Height direction

DETAILED DESCRIPTION

In order to make the objects, technical solutions and advantages of the present application clearer, the present application is further described in detail below with reference to the drawings and embodiments. It should be understood that the specific embodiments are described herein only for illustration of the present application instead of limiting the present application.

In the description of the present application, unless explicitly stated or limited otherwise, the terms "first", "second", "third" are used for descriptive purposes only and are not to be construed as indicating or implying relative importance. The term "plurality" means two or more (including two). The term "connection", unless stated or indicated otherwise, is to be construed broadly, e.g., a "connection" may be a fixed or removable connection or may be integral, electrical or signal connections. A "connection" may be a direct connection or an indirect connection via an intermediate medium. For those of ordinary skill in the art, the specific meanings of the above-mentioned terms in the present application can be understood in accordance with specific conditions.

In the description of the present application, it should be understood that the directional terms "upper", "lower", and the like used in the embodiments of the present application are described from the perspectives shown in the drawings, and should not be construed as limiting the embodiments of the present application. The present application will be further described in detail below through specific embodiments in conjunction with the drawings.

Figure 1:
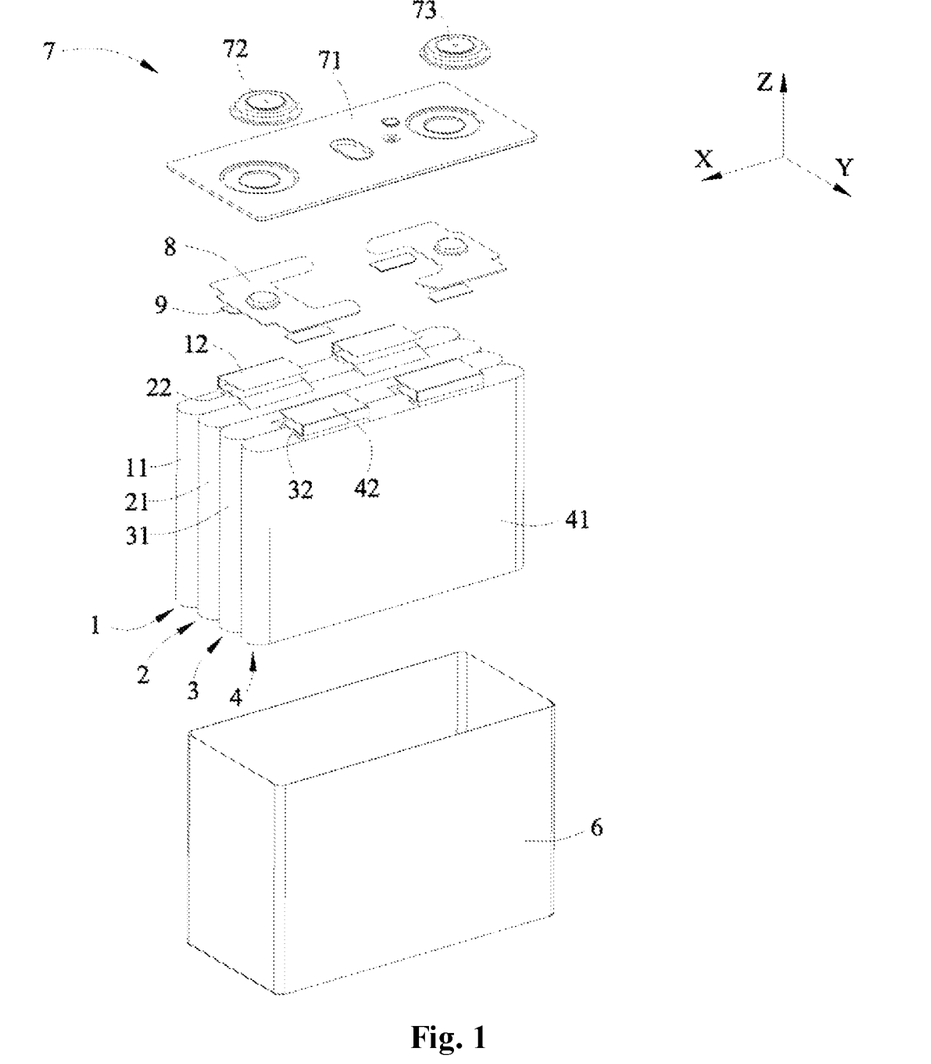
FIG. 1 is an exploded view of a secondary battery according to the present application.

In a first embodiment, referring to FIG. 1, a secondary battery according to the present application includes electrode assemblies, a case 6 and a top cap assembly 7.

An accommodating cavity is formed inside the case 6 to accommodate the electrode assemblies and electrolyte. An opening is formed at one end of the case 6 and the electrode assemblies may be placed into the case 6 through the opening. The case 6 may be made of conductive metal materials such as aluminum or aluminum alloy.

The top cap assembly 7 includes a top cap plate 71, a first electrode terminal 72 and a second electrode terminal 73. The top cap plate 71 is connected to the case 6 and covers the opening of the case 6, thereby enclosing the electrode assemblies in the case 6. The first electrode terminal 72 and the second electrode terminal 73 are arranged on the top cap plate 71. The top cap plate 71 is formed with two through terminal holes, and the first electrode terminal 72 and the second electrode terminal 73 are arranged outside the top cap plate 71 and cover the two terminal holes respectively. In the present application, the first electrode terminal 72 and the second electrode terminal 73 do not occupy the internal space of the case 6.

Figure 4:
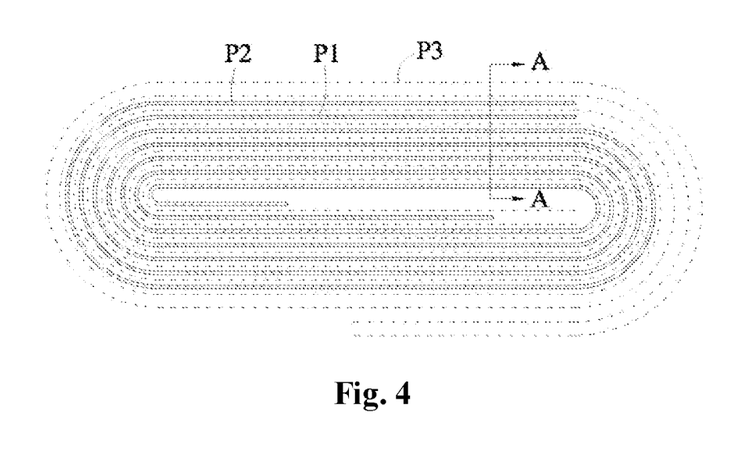
FIG. 4 is a schematic diagram of an electrode assembly of a secondary battery according to the present application.

The electrode assemblies are multiple, and are arranged along a thickness direction Y. Referring to FIG. 4, each of the electrode assemblies includes a positive electrode plate P1, a negative electrode plate P2, and a separator P3. The separator P3 separates the positive electrode plate P1 from the negative electrode plate P2. In some embodiments, the positive electrode plate P1, the negative electrode plate P2 and the separator P3 are wound into a flat structure.

Figure 5:
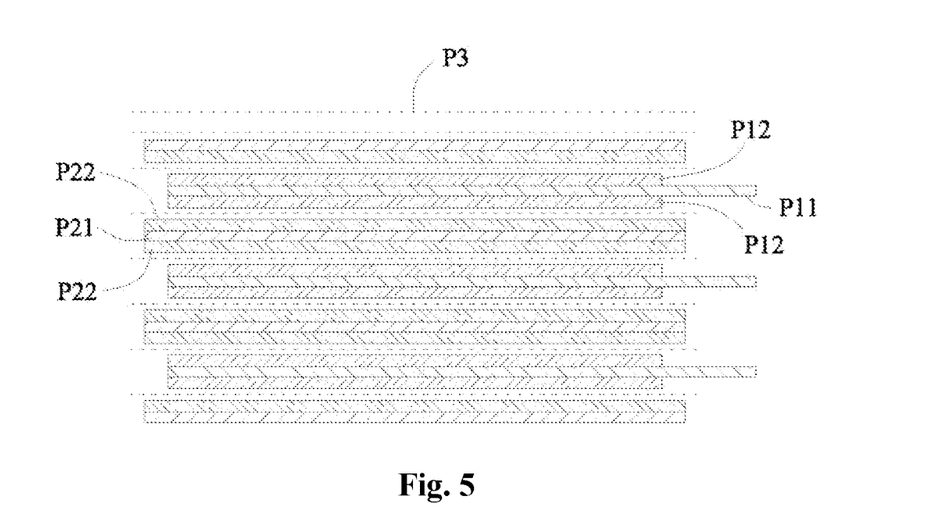
FIG. 5 is a cross-sectional view taken along line A-A in FIG. 4.

Referring to FIG. 5, the positive electrode plate P1 includes a positive current collector P11 and a positive active material layer P12, and the positive active material layer P12 is coated on some region of the positive current collector P11. The positive current collector P11 may be aluminum foil, and the positive active material layer P12 includes a ternary material, lithium manganate or lithium iron phosphate. A positive coated region of the positive electrode plate P1 is formed of the positive active material layer P12 and the region of the positive current collector P11 that is coated with the positive active material layer P12. A positive blank region of the positive electrode plate P1 is formed of the region of the positive current collector P11 that is not coated with the positive active material layer P12. After the positive electrode plate P1 is shaped in a wounded manner, multiple positive blank regions are stacked.

The negative electrode plate P2 includes a negative current collector P21 and a negative active material layer P22, and the negative active material layer P22 is coated on some region of the negative current collector P21. The negative current collector P21 may be copper foil, and the negative active material layer P22 includes graphite or silicon. A negative coated region of the negative electrode plate P2 is formed of the negative active material layer P22 and the region of the negative current collector P21 that is coated with the negative active material layer P22. A negative blank region of the negative electrode plate P2 is formed of the region of the negative current collector P21 that is not coated with the negative active material layer P22. After the negative electrode plate P2 is shaped in a wounded manner, multiple negative blank regions are stacked.

The multiple electrode assemblies include a first electrode assembly 1 and a second electrode assembly 2.

Figure 3:
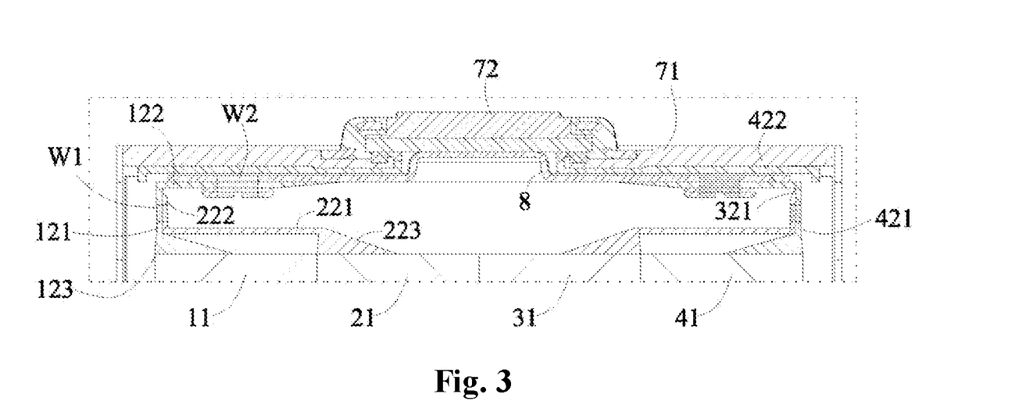
FIG. 3 is an enlarged view of the block shown in FIG. 2.
Figure 6:
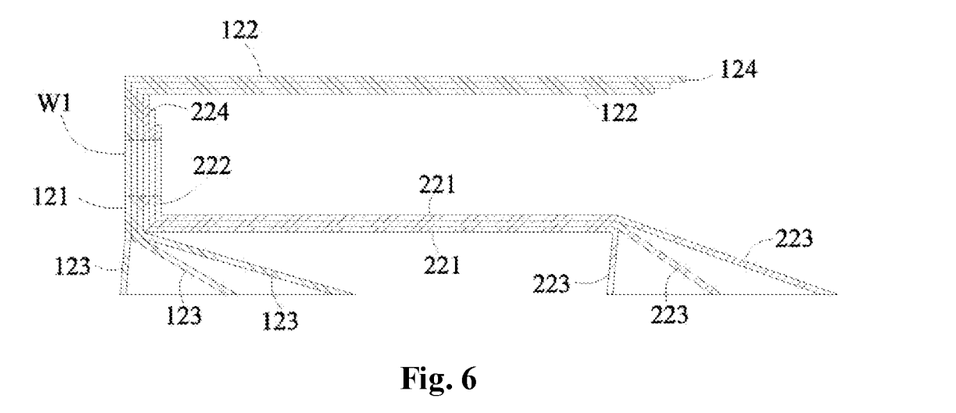
FIG. 6 is a schematic diagram of connection between first tabs and second tabs.

Referring to FIG. 3 and FIG. 6, the first electrode assembly 1 includes a first body 11 and first tabs 12 extending from the first body 11. The first tabs 12 are multiple and stacked. Specifically, the first body 11 includes a positive coated region, a separator P3, and a negative coated region of the first electrode assembly 1. In this embodiment, the first tabs 12 are a negative blank region of the first electrode assembly 1. In an alternative embodiment, the first tabs 12 may also be a positive blank region of the first electrode assembly 1.

The second electrode assembly 2 includes a second body 21 and second tabs 22 extending from the second body 21. The second tabs 22 are multiple and stacked. Specifically, the second body 21 includes a positive coated region, a separator P3, and a negative coated region of the second electrode assembly 2. The polarity of the second tabs 22 is the same as the first tabs 12. In this embodiment, the second tabs 22 are a negative blank region of the second electrode assembly 2.

For convenience of production and assembly, in the secondary battery, the first electrode assembly 1 and the second electrode assembly 2 are generally electrode assemblies of the same specifications, with the length of the first tabs 12 being substantially equal to the length of the second tabs 22.

The second tabs 22 are bent toward a direction approaching the first tabs 12 and connected to the first tabs 12. The end of each of the second tabs 22 that is away from the second body 21 is a second end portion 224.

The first tabs 12 extend from the first body 11. The end of each of the first tabs 12 that is away from the first body 11 is a first end portion 124. The first end portions 124 of the first tabs 12 extend, along the extension direction of the first tabs 12, beyond the second end portions 224 of the second tabs 22. Specifically, each of the first tabs 12 includes a first connecting portion 122 extending beyond the second end portion 224 (that is, the first connecting portion 122 is a portion of each of the first tabs 12 that extends beyond the second end portion 224), and the first connecting portion 122 of each of the first tabs 12 extends beyond the second end portions 224 of all of the second tabs 22. In this application, the first connecting portions 122 of the first tabs 12 are connected to the first electrode terminal 72.

According to the present application, the second tabs 22 are connected with the first tabs 12 first, and then the first connecting portions 122 of the first tabs 12, which extend beyond the second tabs 22, are connected to the first electrode terminal 72. Unlike in the prior art, in the present application, there is no need to connect the first tabs 12 and the second tabs 22 to the first electrode terminal 72 at the same time, that is, there is no need to compensate for the dislocations between the first tabs 12 and the second tabs 22. Therefore, according to the present application, the required length of the tabs can be reduced, materials can be saved, and the tabs being inserted into the first body 11 or the second body 21 can be avoided, which reduces the risk of short circuit.

In some embodiments, the secondary battery according to the present application further includes an adapter piece 8, which connects the first electrode terminal 72 with the first connecting portions 122. The adapter piece 8 may be punched to form a protrusion, which extends to a terminal hole and is welded to the first electrode terminal 72. A recess is formed by the protrusion on the side of the adapter piece 8 that faces the electrode assembly.

In the process of assembly, the second tabs 22 are connected to the first tabs 12 first by means of ultrasonic welding or the like, and then the first connecting portions 122 of the first tab 12 are welded to the adapter plate 8 by means of ultrasonic welding or the like, and finally the adapter piece 8 is welded to the first electrode terminal 72.

If the first tabs 12 are overly long, the first tabs 12 are likely to extend to the lower side of the protrusion of the adapter piece 8 and cover the protrusion, which affects the welding of the protrusion to the first electrode terminal 72. Compared with the prior art, in the present application, the length of the first tabs 12 can be reduced, so that the first tabs 12 covering the protrusion of the adapter piece 8 can be avoided and the welding strength can be ensured.

Each of the first tabs 12 further includes a first extending portion 121 connected between the first connecting portion 122 and the first body 11. In some embodiments, the first extending portion 121 extends from an end of the first connecting portion 122 that is away from the first end portion 124, and the first extending portion 121, relative to the first connecting portion 122, is bent toward a direction approaching the first body 11. By bending the first tabs 12, the space occupied by the first tabs 12 in the height direction Z of the secondary battery can be reduced, and the energy density can be improved.

In some embodiments, the second tabs 22 are welded to the first extending portions 121. During the operation of the secondary battery, the current of the second electrode assembly 2 may flow to the adapter piece 8 via the first extending portions 121 and the first connecting portions 122. Therefore, there is no need for the second tabs 22 to be welded to the adapter piece 8, thereby reducing the required length of the second tabs 22.

Referring to FIG. 6, each of the first tabs 12 further includes a first gathering portion 123 extending from the first body 11 and connected to the first extending portions 121. By bending the first gathering portions 123, the multiple first tabs are gathered together. Compared with the distance between the first tabs 12 and the second tabs 22, the distance between adjacent first tabs 12 is very small. Therefore, when the first tabs 12 are gathered together, the dislocations between the first end portions 124 of the first tabs 12 is small, of which the influence on the welding of the first tabs 12 and the adapter 8 is small.

Each of the second tabs 22 further includes a second extending portion 221, a second connecting portion 222 and a second gathering portion 223. The second gathering portion 223 extends from the second body 21. The second extending portion 221 is connected to an end of the second gathering portion 223 that is away from the second body 21 and extends toward a direction approaching the first extending portion 121. The second connecting portion 222 extends from an end of the second extending portion 221 that is away from the second gathering portion 223.

By bending the second gathering portions 223 of the second tabs 22, the multiple second tabs 22 are gathered together. The extension length of the second extending portion 221 is substantially equal to the distance between the second gathering portion 223 and the first extending portion 121. The second connecting portions 222 and the first extending portions 121 are stacked and are welded together. The second connecting portions 222 are bent relative to the second extending portions 221.

In this embodiment, the second connecting portions 222 of the multiple second tabs 22 are welded to the first extending portions 121 of the multiple first tabs 12 to form the first welded region W1. In the operation, the current of the second electrode assembly 2 may flow to the first tabs 12 via the first welded region W1. The flow capacity between the first tabs 12 and the second tabs 22 is determined by the area of the first welded region W1.

Figure 2:
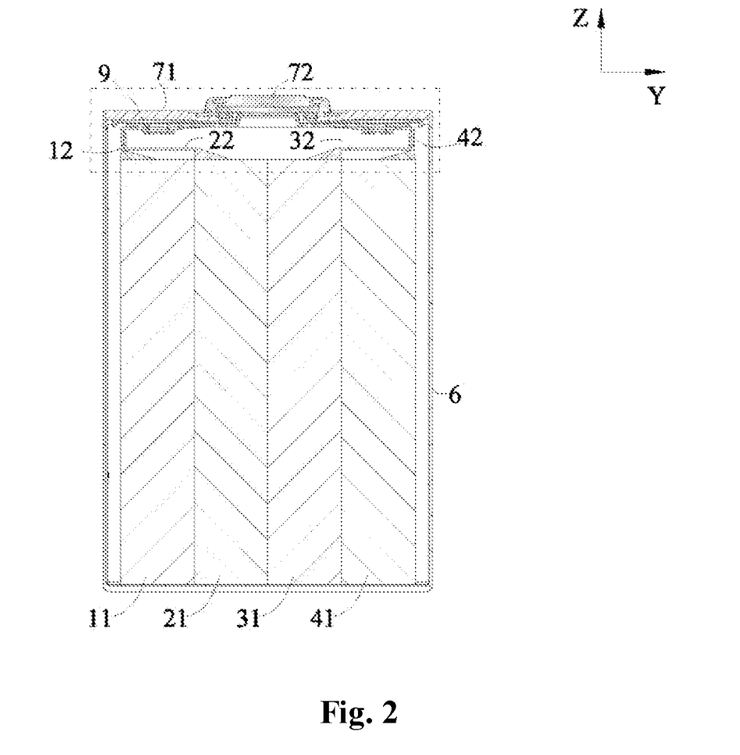
FIG. 2 is a schematic diagram of a first embodiment of a secondary battery according to the present application.

The first connecting portions 122 of the multiple first tabs 12 are welded to the adapter piece 8 to form a second welded region W2. The currents of the first electrode assembly 1 and the second electrode assembly 2 are collected at the first connecting portions 122 and flow to the first electrode terminal 72 via the second welded region W2 and the adapter piece 8. The flow capacity between the first connecting portions 122 and the adapter piece 8 is determined by the area of the second welded region W2. The first tabs 12 are thin and are likely to be damaged during direct welding. Thus, referring to FIG. 2, the present application also includes a welding protection piece 9. The first connecting portions 122 of the multiple first tabs 12 are arranged between the welding protection piece 9 and the adapter piece 8. The welding protection piece 9, the first connecting portions 122 and the adapter piece 8 are welded together to form a second welded region W2.

During the operation of the secondary battery, the current on the second welded region W2 is greater than the current on the first welded region W1, so in some embodiments, the area of the second welded region W2 is larger than the area of the first welded region W1 to improve the overall flow capability. Of course, in order to improve the connection strength of the first tabs 12 and the second tabs 22, the area of the first welded region W1 can also be appropriately increased. That is, the area of the second welded region W2 may be equal to the area of first welded region W1.

Referring to FIG. 3, the multiple first tabs 12 are arranged on a side of the thickness center of the first electrode assembly 1 (that is, the center in the thickness direction Y). Referring to FIG. 4, the first electrode assembly 1 according to the present application has a winded structure, and the thickness center of the first electrode assembly 1 is the winding center of the first electrode assembly 1. Similarly, the multiple second tabs 22 are arranged on a side of the thickness center of the second electrode assembly 2 (that is, the center in the thickness direction Y).

The first tabs 12 are arranged close to an interface between the first electrode assembly 1 and the second electrode assembly 2 and the second tabs 22 are arranged away from the interface between the first electrode assembly 1 and the second electrode assembly 2, or, the second tabs 22 are arranged close to the interface between the first electrode assembly 1 and the second electrode assembly 2 and the first tabs 22 are arranged away from the interface between the first electrode assembly 1 and the second electrode assembly 2. Then the first tabs 12 of the first electrode assembly 1 is arranged in the same manner as that of the second tabs 22 of the second electrode assembly 2, that is to say, the specifications of the first electrode assembly 1 and the second electrode assembly 2 are the same, which can reduce the error and play the role of fool proofing during assembly. In addition, the distance between the first extending portions 121 and the second gathering portions 223 can be increased. Accordingly, the extension length of the second extending portions 221 is increased, and the extension length of the second connecting portions 222 is decreased. When the second connecting portions 222 are shorter, the length of the first connecting portions 122 can be correspondingly increased. When the length of the first connecting portions 122 is increased, sufficient space can be provided for the welding of the first tabs 12 to the adapter piece 8 to avoid interference of the second end portions 224 of the second tabs 22 and ensure the welding strength.

In some embodiments, the first tab 12 is arranged on the side of the thickness center of the first electrode assembly 1 that is away from the interface.

In order to increase the capacity of the secondary battery, the secondary battery according to the present application may further include a third electrode assembly 3 and a fourth electrode assembly 4 housed in the case 6. The first electrode assembly 1, the second electrode assembly 2, and the third electrode assembly 4 and the fourth electrode assembly 4 are sequentially arranged.

The third electrode assembly 3 includes a third body 31 and third tabs 32 extending from the third body 31. The third tabs 32 are multiple and stacked. Specifically, the third body 31 includes a positive coated region, a separator P3, and a negative coated region of the third electrode assembly 3. The polarity of the third tabs 32 is the same as the first tabs 12. In this embodiment, the third tabs 32 are a negative blank region of the third electrode assembly 3.

The fourth electrode assembly 4 includes a fourth body 41 and fourth tabs 42 extending from the fourth body 41. The fourth tabs 42 are multiple and stacked. Specifically, the fourth body 41 includes a positive coated region, a separator P3, and a negative coated region of the fourth electrode assembly 4. The polarity of the fourth tabs 42 is the same as the first tabs 12. In this embodiment, the fourth tabs 42 are a negative blank region of the fourth electrode assembly 4.

Referring to FIG. 3, the third tabs 32 are bent toward a direction approaching the fourth tabs 42 and connected to the fourth tabs 42, and an end of each of the third tabs 32 that is away from the third body 31 is a third end portion 321.

The fourth tabs 42 extend from the fourth body 41, and the fourth tabs 42 extend, along the extension direction of the fourth tabs 42, beyond the third end portions 321 of the third tabs 32. Specifically, each of the fourth tabs 42 includes a fourth connecting portion 422 extending beyond the third end portion 321 (that is, the fourth connecting portion 422 is a portion of each of the fourth tabs 42 that extends beyond the third end portion 321), and the fourth connecting portion 422 of the each of the fourth tabs 42 extends beyond the third end portions 321 of all of the third tabs 32. In this application, the fourth connecting portions 422 are connected to the first electrode terminal 72.

Figure 7:
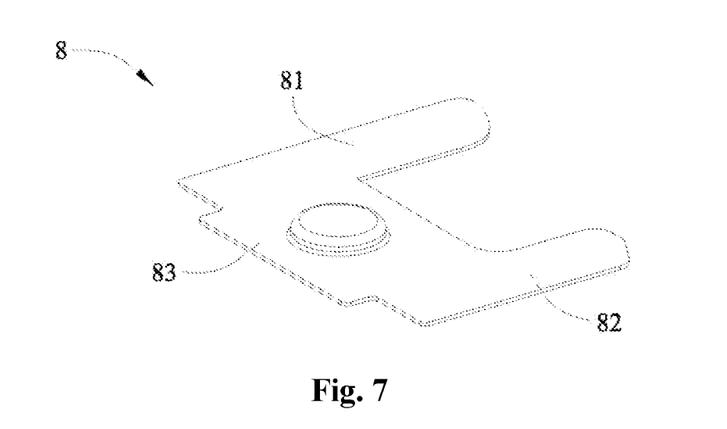
FIG. 7 is a schematic diagram of an adapter piece of a secondary battery according to the present application.

Referring to FIG. 7, the adapter piece 8 includes a first portion 81, a second portion 82, and a third portion 83. The first portion 81 is welded to the first connecting portions 122, the second portion 82 is welded to the fourth connecting portions 422, and the third portion 83 is connected between the first portion 81 and the second portion 82. The third portion 83 is punched to form a protrusion, and the protrusion is welded to the first electrode terminal 72.

According to the present application, the third tabs 32 are connected with the fourth tabs 42 first, and then the fourth connecting portions 422 of the fourth tabs 42, which extend beyond the third tabs 32, are connected to the first electrode terminal 72. Unlike in the prior art, in the present application, there is no need to connect the third tabs 32 and the fourth tabs 42 to the first electrode terminal 72 at the same time, that is, there is no need to compensate for the dislocations between the third tabs 32 and the fourth tabs 42. Therefore, according to the present application, the required length of the tabs can be reduced, materials can be saved, and the tabs being inserted into the third body 31 or the fourth body 41 can be avoided, which reduces the risk of short circuit.

Referring to FIG. 3, each of the fourth tabs 42 further includes a fourth extending portion 421. The fourth extending portion 421 is connected between the fourth connecting portion 422 and the fourth body 41. In some embodiments, the fourth extending portion 421, relative to the fourth connecting portion 422, is bent toward a direction approaching the fourth body 41. By bending the fourth tabs 42, the space occupied by the fourth tabs 42 in the height direction Z of the secondary battery can be reduced, and the energy density can be improved.

Referring to FIG. 3, the multiple third tabs 32 are arranged on a side of the thickness center of the third electrode assembly 3 (that is, the center along the thickness direction Y), and the multiple fourth tabs 42 are arranged on a side of the thickness center of the fourth electrode assembly 4 (that is, the center along the thickness direction Y).

In some embodiments, the multiple first tabs 12 are arranged on a side of the thickness center of the first electrode assembly 1 that is away from the second electrode assembly 2, and the multiple second tabs 22 are arranged on a side of the thickness center of the second electrode assembly 2 that is close to the first electrode assembly 1. At the same time, the multiple fourth tabs 42 are arranged on a side of the thickness center of the fourth electrode assembly 4 that is away from the third electrode assembly 3, and the multiple third tabs 32 are arranged on the thickness center of the third electrode assembly 3 that is close to the fourth electrode assembly 4. In this way, the distance between the fourth tabs 42 and the first tabs 12 can be increased, thereby increasing the extension length of the third portion 83 of the adapter piece 8 and providing a sufficient area for the punching the protrusion. At the same time, the length of the third portion 83 of the adapter piece 8 is great, which makes it convenient to provide a fuse hole on the third portion 83.

Other embodiments of the secondary battery according to the present application are described below. For brevity, only the differences between the other embodiments and the first embodiment are mainly described below, and the parts not described can be understood with reference to the first embodiment.

Figure 8:
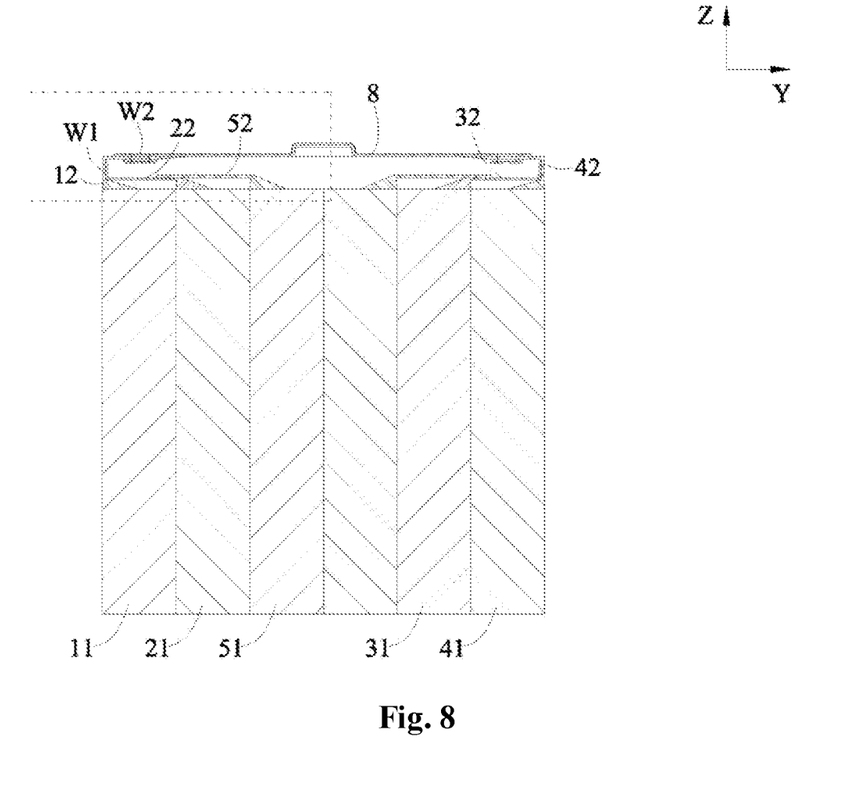
FIG. 8 is a schematic diagram of a second embodiment of a secondary battery according to the present application, in which a case and a top cap assembly are omitted.
Figure 9:
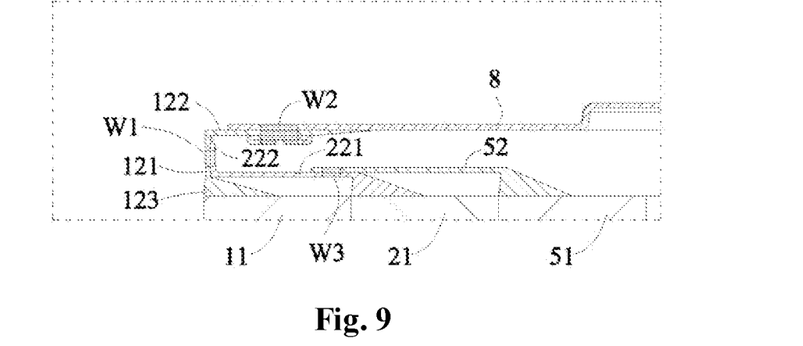
FIG. 9 is an enlarged view of the block shown in FIG. 8.

FIG. 8 and FIG. 9 are schematic diagrams of a second embodiment of the secondary battery according to the present application. Compared with the first embodiment, the secondary battery according to the second embodiment further includes a fifth electrode assembly 5 housed in the case 6. The fifth electrode assembly 5 is arranged on the side of the second electrode assembly 2 that is away from the first electrode assembly 1.

The fifth electrode assembly 5 includes a fifth body 51 and fifth tabs 52 extending from the fifth body 51. The fifth tabs 52 are multiple and stacked. Specifically, the fifth body 51 includes a positive coated region, a separator P3, and a negative coated region of the fifth electrode assembly 5. The polarity of the fifth tabs 52 is the same as the first tabs 12. In this embodiment, the fifth tabs 52 are a negative blank region of the fifth electrode assembly 5.

The fifth tabs 52 are bent toward a direction approaching the second tabs 22 and welded to the second tabs 22. Specifically, the fifth tabs 52 may be fixed to the second extending portions 221 by means of ultrasonic welding to form a third welded region W3.

In the prior art, if the tabs of the three electrode assemblies are gathered together and welded to the adapter piece 8 at the same time, then severe dislocations between the tabs of the three electrode assemblies will occur. Compared with two electrode assemblies, three electrode assemblies require a greater length of the tabs. In the present application, the fifth tabs 52 needs to be welded to only the second extension 221, and do not need to be welded to the first tabs 12 or the adapter piece 8. Therefore, the present application can effectively reduce the required length of the tabs.

During the operation of the secondary battery, the current in the first welded region W1 will be greater than the current in the third welded region W3. In some embodiments, to meet the requirements for flow capacity and strength, the area of the first welded region W1 is equal to or greater than the area of the third welded region W3.

Figure 10:
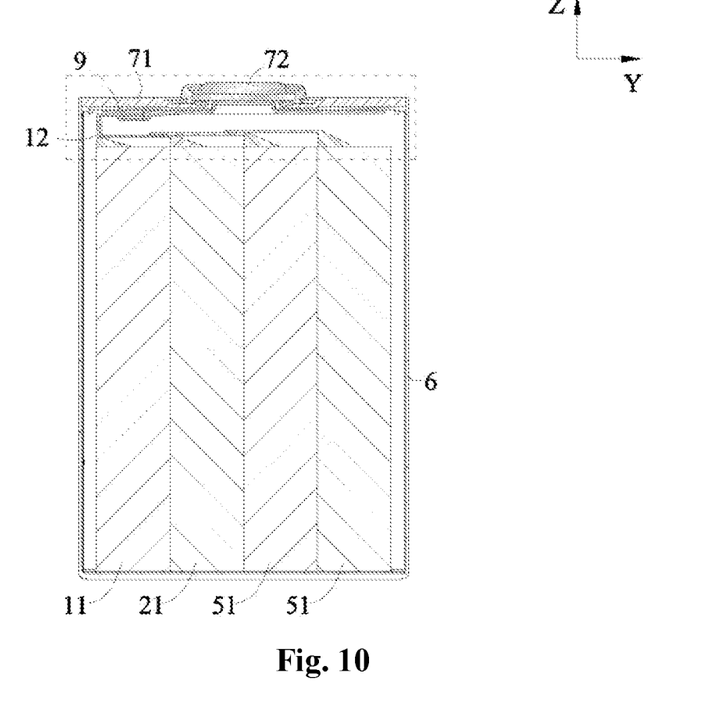
FIG. 10 is a schematic diagram of a third embodiment of a secondary battery according to the present application.
Figure 11:
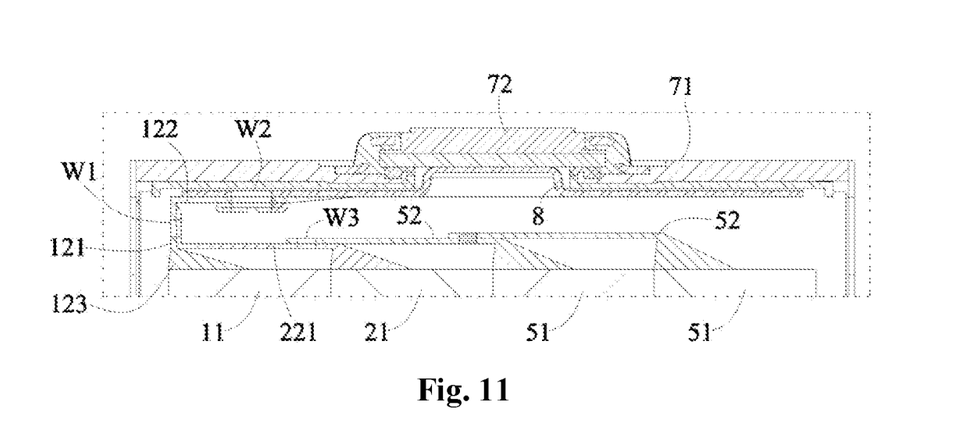
FIG. 11 is an enlarged view of the block shown in FIG. 10.

FIG. 10 and FIG. 11 are schematic diagrams of a third embodiment of the secondary battery according to the present application. Compared with the second embodiment, the third electrode assembly 3 and the fourth electrode assembly 4 are omitted in the third embodiment. That is, the secondary battery in the third embodiment only includes the first electrode assembly 1, the second electrode assembly 2, and the fifth electrode assembly 5.

In some embodiments, in the third embodiment, the secondary battery includes multiple fifth electrode assemblies 5, and the multiple fifth electrode assemblies 5 are sequentially arranged along a direction away from the second electrode assembly 2, and fifth tabs 52 of each of the fifth electrode assemblies 5 are bent toward a direction approaching the second tabs 22. The fifth tabs 52 of a fifth electrode assembly 5 adjacent to the second electrode assembly 2 are welded to the second tabs 22. The fifth tabs 52 of each of the other fifth electrode assemblies 5 than the fifth electrode assembly 5 adjacent to the second electrode assembly 2 are welded to the fifth tabs 52 of an adjacent fifth electrode assembly 5.

Compared with the second embodiment, the adapter piece 8 needs to be welded only to the first connecting portion 122. Therefore, the structure of the adapter piece 8 can be simplified (for example, the second portion 82 can be removed), thereby reducing the space occupied by the adapter piece 8.

Figure 12:
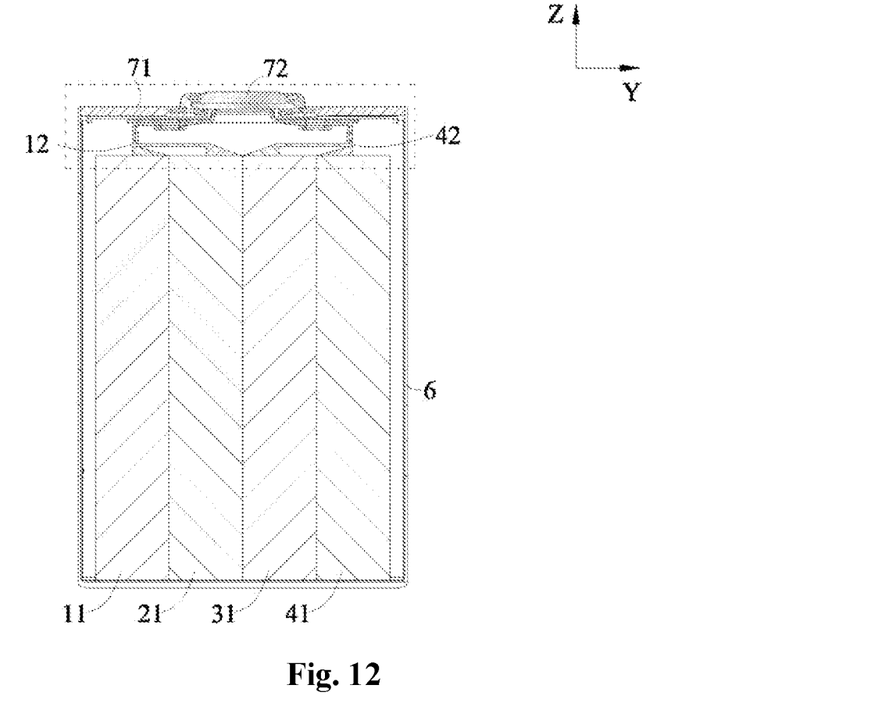
FIG. 12 is a schematic diagram of a fourth embodiment of a secondary battery according to the present application.
Figure 13:
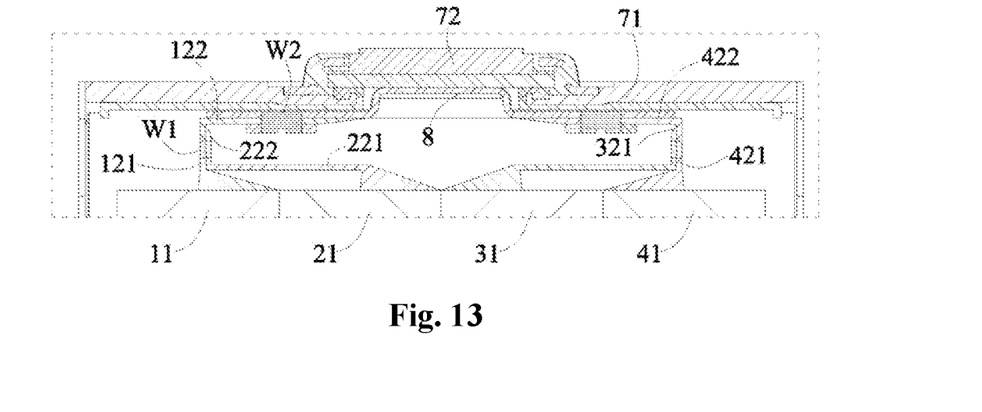
FIG. 13 is an enlarged view of the block shown in FIG. 12.

FIG. 12 and FIG. 13 are schematic diagrams of a fourth embodiment of the secondary battery according to the present application. Compared with the first embodiment, the positions of the tabs in the fourth embodiment are different.

Specifically, the multiple first tabs 12 are arranged on a side of the thickness center of the first electrode assembly 1 that is close to the second electrode assembly 2, and the multiple second tabs 22 are arranged on a side of the thickness center of the second electrode assembly 2 that is away from the first electrode assembly 1. At the same time, the multiple fourth tabs 42 are arranged on a side of the thickness center of the fourth electrode assembly 4 that is close to the third electrode assembly 3, and the multiple third tabs 32 are arranged on the thickness center of the third electrode assembly 3 that is away from the fourth electrode assembly 4.

Compared with the first embodiment, the fourth embodiment can reduce the distance between the fourth tabs 42 and the first tabs 12, reduce the extension length of the third portion 83 of the adapter piece 8, thus saving materials.

The embodiments of the present disclosure further provide an apparatus, which includes the secondary battery according to any of the embodiments as described above, where the secondary battery is adapted to provide power for the apparatus. The apparatus may be an electric vehicle, a hybrid vehicle, an electric scooter, an electric cart or any other suitable devices which can include the secondary battery as its own power source.

What is claimed is:

1. A secondary battery, comprising a first electrode assembly, a second electrode assembly, a case and a top cap assembly;
the first electrode assembly and the second electrode assembly are housed in the case;
the top cap assembly comprises a top cap plate and a first electrode terminal, the top cap plate is connected to the case, and the first electrode terminal is arranged on the top cap plate;
the first electrode assembly comprises a first body and first tabs extending from the first body, and the first tabs are multiple and stacked;
the second electrode assembly comprises a second body and second tabs extending from the second body, and the second tabs are multiple and stacked;
the second tabs are bent toward a direction approaching the first tabs and connected to the first tabs, and an end of each of the second tabs that is away from the second body is a second end portion;
each of the first tabs comprises a first connecting portion extending beyond the second end portions of the second tabs, and the first connecting portion is connected to the first electrode terminal.

2. The secondary battery according to claim 1, wherein each of the first tabs further comprises a first extending portion, the first extending portion is connected between the first connecting portion and the first body, and the second tabs are welded to first extending portions of the first tabs.

3. The secondary battery according to claim 2, wherein each of the second tabs further comprises a second extending portion and a second connecting portion, the second extending portion is connected to the second body and extends toward a direction approaching the first extending portion of the first tab, and the second connecting portion extends from an end of the second extending portion that is away from the second body, and is welded to the first extending portion of the first tab.

4. The secondary battery according to claim 3, wherein second connecting portions of the second tabs are welded to the first extending portions of the multiple first tabs to form a first welded region.

5. The secondary battery according to claim 4, wherein the secondary battery further comprises an adapter piece, and the adapter piece is connected to the first electrode terminal;
first connecting portions of the first tabs are welded to the adapter piece to form a second welded region, and an area of the second welded region is greater than or equal to an area of the first welded region.

6. The secondary battery according to claim 1, wherein the first tabs are arranged on a side of a thickness center of the first electrode assembly;
the second tabs are arranged on a side of a thickness center of the second electrode assembly;
the first tabs are arranged close to an interface between the first electrode assembly and the second electrode assembly and the second tabs are arranged away from the interface between the first electrode assembly and the second electrode assembly, or, the second tabs are arranged close to the interface between the first electrode assembly and the second electrode assembly and the first tabs are arranged away from the interface between the first electrode assembly and the second electrode assembly.

7. The secondary battery according to claim 6, wherein the first tabs are arranged on a side of the thickness center of the first electrode assembly that is away from the interface.

8. The secondary battery according to claim 1, wherein the secondary battery further comprises a third electrode assembly and a fourth electrode assembly that are housed in the case, and the first electrode assembly, the second electrode assembly, the third electrode assembly and the fourth electrode assembly are sequentially arranged;
the third electrode assembly comprises a third body and third tabs extending from the third body, and the third tabs are multiple and stacked;
the fourth electrode assembly comprises a fourth body and fourth tabs extending from the fourth body, and the fourth tabs are multiple and stacked;

the third tabs are bent toward a direction approaching the fourth tabs and connected to the fourth tabs, and an end of each of the third tabs that is away from the third body is a third end portion;

each of the fourth tabs comprises a fourth connecting portion extending beyond the third end portion, and the fourth connecting portion is connected to the first electrode terminal.

9. The secondary battery according to claim 1, wherein the secondary battery further comprises a fifth electrode assembly, the fifth electrode assembly is housed in the case, and the fifth electrode assembly is arranged on a side of the second electrode assembly that is away from the first electrode assembly;

the fifth electrode assembly comprises a fifth body and fifth tabs extending from the fifth body, and the fifth tabs are bent toward a direction approaching the second tabs and welded to the second tabs.

10. The secondary battery according to claim 9, wherein the secondary battery comprises multiple fifth electrode assemblies sequentially arranged in a direction away from the second electrode assembly, and fifth tabs of each of the fifth electrode assemblies are bent toward a direction approaching the second tabs;

the fifth tabs of a fifth electrode assembly adjacent to the second electrode assembly are welded to the second tabs;

the fifth tabs of each of the other fifth electrode assemblies than the fifth electrode assembly adjacent to the second electrode assembly are welded to the fifth tabs of an adjacent fifth electrode assembly.

\* \* \* \* \*